United States Patent [19]
Yuhasz

[11] Patent Number: 4,967,303
[45] Date of Patent: Oct. 30, 1990

[54] SURGE SUPPRESSION SYSTEM FOR SUBMERSIBLE ELECTRICAL MOTORS

[75] Inventor: Frank U. Yuhasz, Ashland, Ohio

[73] Assignee: McNeil (Ohio) Corporation, St. Paul, Minn.

[21] Appl. No.: 351,372

[22] Filed: May 15, 1989

[51] Int. Cl.⁵ .............................................. H02H 9/06
[52] U.S. Cl. ...................................... 361/23; 361/33; 361/120; 318/434
[58] Field of Search ...................... 361/23, 33, 56, 120; 318/434

[56] References Cited

U.S. PATENT DOCUMENTS

| | | | |
|---|---|---|---|
| 3,849,704 | 11/1974 | Streater | 361/23 |
| 3,906,273 | 9/1975 | Kozlowski | 361/120 X |
| 3,997,232 | 12/1976 | Dunaway | 361/23 |
| 4,266,260 | 5/1981 | Lange et al. | 361/120 |
| 4,733,324 | 3/1988 | George | 361/120 X |

Primary Examiner—Todd E. DeBoer
Attorney, Agent, or Firm—Renner, Kenner, Greive, Bobak, Taylor & Weber

[57] ABSTRACT

An electrically surge protected motor (13) includes a housing (14) which when in a fluid is in communication with electrical ground. The motor (13) has an end ring (17) in contact with the housing (14), stator windings (15) within the housing (14), and power wires (21) which provide electrical power to the windings (15). A surge suppressor (23) is electrically connected between each power wire (21) and the end ring (17) and includes a gas filled chamber (31) within which are spaced electrodes (27). One of the electrodes (27) is electrically connected to the power wire (21) and the other electrode (27) is electrically connected to the end ring (17). The conductivity of the gas in the chamber (31) is such that at a predetermined voltage level in the power wire (21), electrical current will be diverted from the windings (15), pass through the chamber (31) between the spaced electrodes (27), and thereafter pass to ground through the motor housing (14).

11 Claims, 2 Drawing Sheets

SURGE SUPPRESSION SYSTEM FOR SUBMERSIBLE ELECTRICAL MOTORS

TECHNICAL FIELD

This invention relates to a system of protecting submerged electrical motors from high voltage surges. More particularly, this invention relates to the protection of the windings of a motor, such as a motor for a submersible pump, from high voltages caused by lightning or the like.

BACKGROUND ART

It is desirable, if not mandatory, to provide submersible electric motors, such as used to provide the power for a submersible pump in the environment of a well, with protection for sudden high voltage surges. Without such protection, if lightning, for example, were to induce a voltage surge into the electrical wires leading down to the pump, the high voltage created thereby would be carried down to the motor and potentially burn up the windings thereof.

One of the easier known, but less effective, methods of protecting such motors from electrical surges is to provide a conventional surge protection or lightning arresting device externally of the motor. Most conveniently, these are provided above ground and tied, for example, to the incoming line of the control box for the system. However, being remote from the motor which could, for example, be several hundred feet away at the bottom of a well, protection against surges induced between the control box and the motor is not afforded.

As an alternative, surge suppressors have been provided along the power line in the well near the motor. While being closer to the motor and therefore affording better protection than similar devices located at the control box, such a system is not without problems of its own. In particular, such items are rather costly to manufacture and install. First, the surge suppressor must be totally encapsulated and sealed from the liquid environment of the well. In addition, the encapsulated suppressor must be sufficiently small to be received in the cramped confines of the well environment where there is often barely space for the power wires let alone the surge suppression system. Moreover, proper installation of such a device is tedious and without careful attention, the suppression device could easily be damaged thereby leaving the motor unprotected.

Another approach is to attempt to position a surge suppressor directly within the motor housing at exemplified by U.S. Pat. No. 3,849,704. In the device shown in that patent, a bore must be drilled in the motor housing and then a lightning arrestor, of an arc-extinguishing, gas expulsion type, is press fit into the bore. The outer surface of the lightning arrestor acts as one electrode and in the event of a voltage surge, spark gaps in the arrestor break down shorting the voltage surge through the motor housing. The heat from the arcing causes a disc which is adjacent the gap to generate a gas which extinguishes the arc so that normal motor operation can continue.

There are many problems inherent with such a system. For example, the device is costly and tedious to manufacture, requiring several operational steps. First, hole must be precisely bored in the housing to accept the press fit of the lightning arrestor to assure the electrical connection. Then an elaborate seal is necessary to assure that potting material used to hold the motor windings, terminals and the like in place is not allowed to seep into the chamber of the lightning arrestor.

From an operational standpoint, the gas expulsion type of lightning arrestor is undesirable in that upon each voltage surge, gas is emitted into the arrestor chamber which will eventually build up enough pressure to cause the housing to fracture and the arrestor to fail. Such failure cannot be detected by the user and therefore the next voltage surge can damage the motor. Moreover, as the gas emitting disc ages through use and its strength diminishes, it will not react as quickly causing inefficient and detrimental operation. Finally, when the disc is no longer able to emit gas, if the housing has not already fractured by that time because of the gas build up, the next voltage surge can permanently short out the motor. It is highly likely at that time that the whole motor, rather than merely the worn out arrestor, would have to be replaced.

DISCLOSURE OF THE INVENTION

It is thus a primary object to the present invention to provide a system for protecting a submersible motor from high voltage surges which is situated in the motor itself thereby eliminating the problems associated with surge suppressors located remote from the motor.

It is another object of the present invention to provide a system, as above, which is easy to manufacture, assemble and maintain.

It is a further object of the present invention to provide a system, as above, which maintains an essentially constant voltage protection for relatively unlimited voltage surges.

It is an additional object of the present invention to provide a system, as above, which continually protects the motor from voltage surges of a predetermined value.

It is yet another object of the present invention to provide a system, as above, which does not utilize a gas expulsion type surge arrestor but rather uses a gas tube voltage suppression device which can be constructed to be very tiny and therefore suitable for mounting in otherwise inaccessible places in the motor.

These and other objects of the present invention, which will become apparent from the description to follow, are accomplished by the means hereinafter described and claimed.

In general, an electrically surge protected motor includes a housing which in its submerged condition will be in communication with electrical ground. The motor has an end ring in contact with the housing, stator windings within the housing and power wires providing electrical power to the windings. A surge suppressor is provided for each power wire and includes a gas filled chamber with two spaced electrodes therein. One of the electrodes is electrically connected to the power wires and the other is electrically connected to the end ring. The conductivity of the gas in the chamber is such that at a predetermined voltage level in a power wire, electrical current will be diverted from the windings, pass through the chamber from one electrode to the other and thereafter pass to ground through the motor housing.

PREFERRED EMBODIMENT FOR CARRYING OUT THE INVENTION

Figure 1:
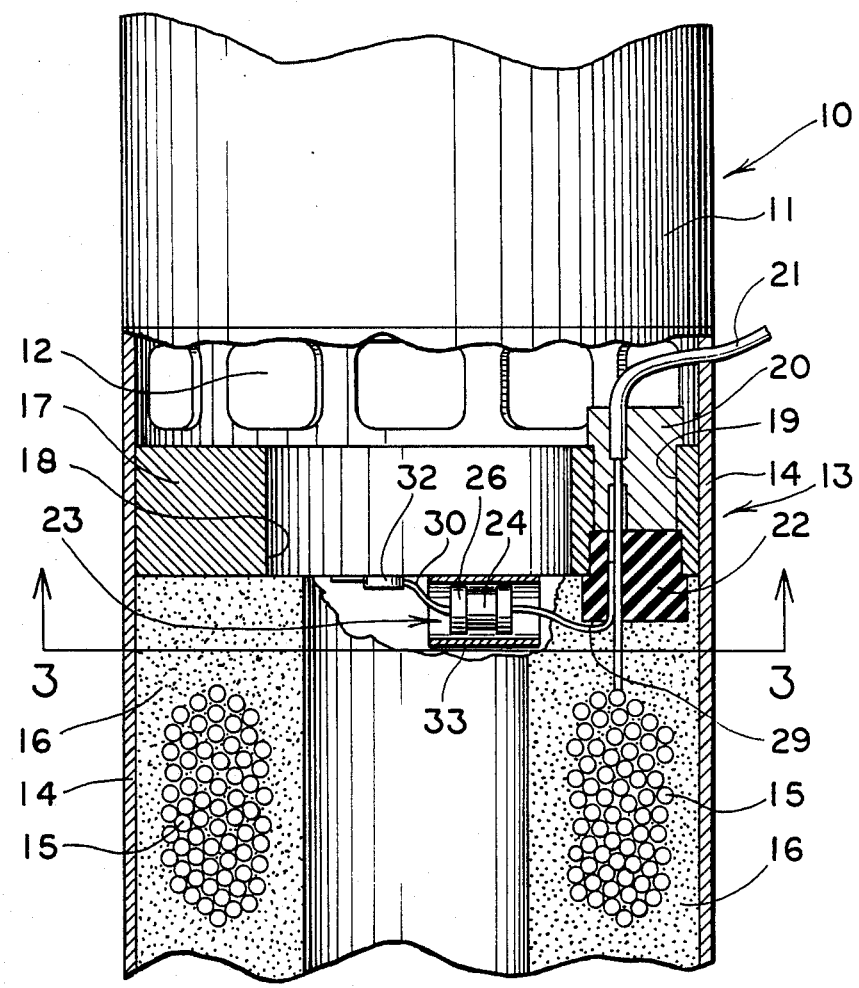
FIG. 1 is a somewhat schematic, fragmented, and partially sectioned and partially broken away view of a submersible pump having the concepts of the present invention.

A submersible pump is indicated generally by the numeral 10 in FIG. 1 and includes a pump unit 11 which may consist of a plurality of stacked conventional impellers and diffusers (not shown). Integral with and below pump unit 11 is a pump inlet section 12 through which fluid to be pumped by pump unit 11 is drawn as from a well which is a typical environment for submersible pump 10. The third component of a typical submersible pump 10 is the electric motor which is indicated generally by the numeral 13 and which is shown as being integral with and below pump inlet section 12.

Motor 13 includes a generally cylindrical metallic outer housing 14, stator windings 15 held in place by a potting compound 16 (shown broken away for clarity), and a metallic end ring 17 attached to housing 14 above windings 15. Motor 13 also includes a rotor (not shown) which extends upwardly within the stator windings 15, through a central opening 18 in end ring 17, and into pump inlet section 12 where it is coupled to a pump shaft (not shown) which carries the impellers of pump unit 11 to impart rotary motion thereto.

End ring 17 is also provided with a stepped aperture 19 therethrough, the upper portion of which receives an insulating plug insert 20 which carries power wires 21 which originate at a power source above the well. An insulating grommet 22 is inserted into the lower end of aperture 19 and the wires 21 pass therethrough to windings 15.

Figure 2:
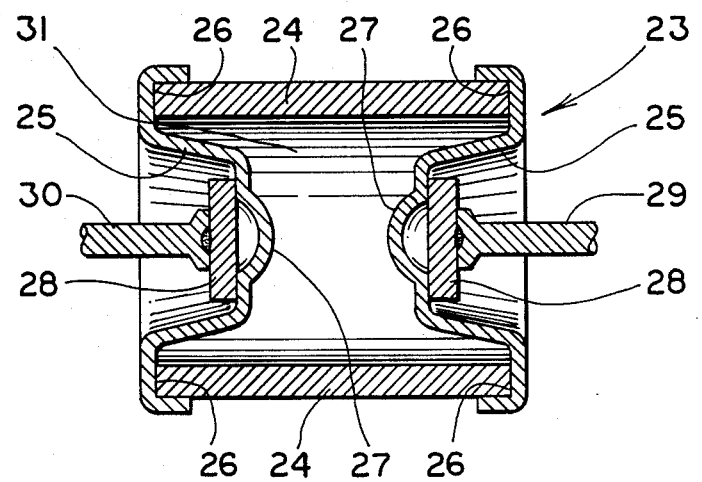
FIG. 2 is an enlarged sectional view of the surge suppressor shown in FIG. 1.

In order to protect windings 15 from sudden voltage surges in wires 21, as might happen were the wire to be struck by lightning, a surge suppressor, generally indicated by the numeral 23, is provided for each wire 21. Thus, as shown in FIG. 2, there are two surge suppressors 23 for the two wires 21, it being understood that for other types of motors which may, for example, have three power lines, three surge suppressors would be required.

Surge suppressor 23 is quite unique in that it is very tiny, measuring approximately ⅜ inch in length and ⅛ inch in diameter, and yet it can withstand surges of 10,000 volts or more. As best shown in FIG. 2, each surge suppressor 23 includes a cylindrical outer housing 24 which can be made of any suitable type of insulating material such as ceramic or glass. Electrode plates 25 are mounted to each end of housing 24 and hermetically sealed thereto, as at 26. Plates 25 are shaped so as to form opposing arcuate electrodes 27 at their innermost points. Wire mounting pedestals 28 are affixed to the outside of plates 25 at the area of electrodes 27. Surge suppression lead wires 29 and 30 are attached to pedestals 28. The interior chamber 31 of each surge suppressor is filled with a gas, such as an argon/nitrogen mix, which has a higher resistance and is more stable than air. The particular gas and/or the mixture thereof can be selected so that the conductivity of the gas permits conduction, that is, an arcing over from one electrode 27 to the other, at a voltage level which would do damage to the motor windings 15. During the manufacturing process, chamber 31 is first evacuated and then the known gas mixture is injected into chamber 31 thereby giving the surge suppressor a preselected resistivity rating.

Figure 3:
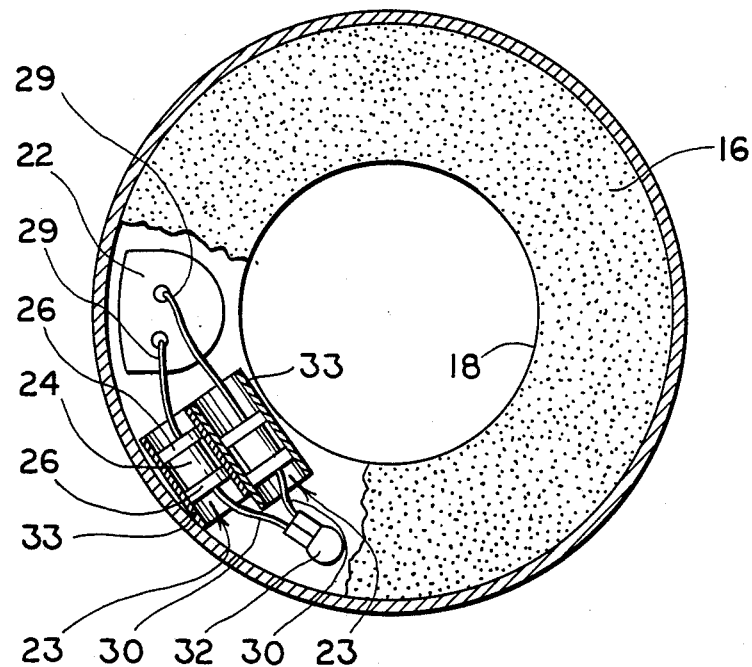
FIG. 3 is a sectional view taken substantially along line 3—3 of FIG. 1.

The manner in which surge suppressors 23 are installed in motor 13 can best be seen with reference to FIGS. 1 and 3. Before potting compound 16 is introduced into motor 13, a small space exists between windings 15 and end ring 17. This space is typically just large enough so that surge suppressors 23 can be positioned therein, and thus the overall size of motor 13 is not increased. Each suppressor lead wire 29 is inserted into grommet 22 and is in physical contact with each power wire 21 respectively. Each suppressor lead wire 30 is crimped onto a terminal 32 which is attached to the underside of end plate 17. An insulating sleeve 33 is positioned around each surge suppressor 23 to prevent accidental short circuiting should an electrode plate 25 inadvertently come into contact with end plate 17. For clarity, sleeve 33 is shown in section in FIGS. 1 and 3 so that surge suppressor 23 is not hidden. In reality, however, sleeve 33 completely surrounds suppressor 23. Then potting compound 16 is introduced totally filling all voids within motor 13.

In operation, at normal voltages electrical power provided through wires 21 will operate motor 13. Should a voltage surge occur greater than the predetermined rating of the gas in chamber 31 of a surge suppressor 23, this voltage will seek its path of least resistance and pass along suppressor lead wire 29 and an arc will occur across electrode 27. The current is thus transmitted through suppressor lead wire 30 to end plate 17, to motor housing 14 and thus to ground through the liquid in which motor housing 14 is submerged. Once the surge potential drops below the predetermined value for protection of the motor, the arc across electrodes 27 stops and all power is directed back to the motor windings for normal operation.

While the above describes the preferred embodiment of the present invention, the teachings are not to be so restricted. Alternative embodiments, which utilize the teachings herein set forth, are intended to be within the scope and spirit of the present invention. Moreover, from the foregoing it should be evident that a motor constructed with the surge protection system of the present invention will substantially improve the submersible motor art and otherwise accomplish the objects of the present invention.

I claim:

1. An electrically surge protected submersible motor comprising a housing in communication with electrical ground when the motor is submersed; an end ring in contact with said housing; stator windings within said housing and spaced from said end ring; power wires providing electrical power to said windings; surge protection means electrically connected between each said power wire and said end ring and positioned in the space between said end ring and said stator windings; and an insulating sleeve around each said surge protection means; each said surge protection means including a gas filled chamber, a first electrode in said chamber electrically connected to a said power wire, and a second electrode in said chamber spaced from said first electrode and electrically connected to said end ring; the conductivity of the gas in said chamber being such that at a predetermined voltage level in a said power wire, electrical current will be diverted from said windings and pass from said first electrode through said chamber to said second electrode and from said second electrode to said end ring and said housing.

2. An electrically surge protected submersible motor according to claim 1 wherein said end ring has an aperture therein and further comprising insulating means in said aperture carrying said power wires.

3. An electrically surge protected submersible motor according to claim 2 each said surge protection means further including a lead wire electrically connected to said first electrode and extending into said insulating means to contact a said power wire.

4. An electrically surge protected submersible motor according to claim 3 further comprising a terminal mounted on said end ring, each said surge protection means further including a second lead wire electrically connecting said second electrode to said terminal.

5. An electrically surge protected submersible motor according to claim 1 wherein said surge protection means includes an outer housing constructed of a non-conductive material and electrode plates hermetically sealed to the ends of said outer housing and configured to form said electrodes within said outer housing.

6. An electrically surge protected submersible motor according to claim 5 said surge protection means also including first and second pedestals attached to the outside of each said electrode plate adjacent said first and second electrodes, respectively.

7. An electrically surge protected submersible motor according to claim 6 wherein said surge protection means includes a fist lead wire attached at one end to said first pedestal and at the other end to a said power wire and a second lead wire attached at one end to said second pedestal and at the other end to said end ring.

8. In combination, a submersible motor and a surge protection system; the motor having a metallic housing, a metallic end ring engaged by said housing, stator windings within said housing and spaced slightly from said end ring, and power wires extending through said end ring and to said stator windings; the surge protection system including a gas filled chamber for each power wire and positioned in the space between said end ring and said stator windings, said gas filled chamber being defined by a generally cylindrical housing constructed of a non-conducting material and an electrode plate. hermetically sealed at each end of said cylindrical housing, an insulating sleeve around said housing, first and second electrodes formed in each end of said chamber by each said electrode plate, means to connect said first electrode to a said power wire, and means to connect said second electrode to aid end ring; the gas in said chamber permitting conduction of electricity to said housing when a predetermined voltage is exceeded in a said power wire.

9. The combination of claim 8 wherein said surge protection system further includes pedestals attached to said electrode plates outside said chamber, said pedestals carrying said means to connect said first electrode to a said power wire and said means to connect said second electrode to said end ring.

10. The combination of claim 8 wherein said means to connect said first electrode to a said power wire includes grommet means in said end ring carrying said power wire and insulating said power wire from said end ring, and a lead wire extending from said first electrode and electrically connected to said power wire in said grommet means.

11. The combination of claim 8 wherein said means to connect said second electrode to said end ring includes a terminal on said end ring and a lead wire extending from said terminal to said second electrode.

* * * * *

UNITED STATES PATENT AND TRADEMARK OFFICE
CERTIFICATE OF CORRECTION

PATENT NO.   :   4,967,303
DATED        :   October 30, 1990
INVENTOR(S)  :   Frank U. Yuhasz It is certified that error appears in the above-identified patent and that said Letters Patent is hereby corrected as shown below:

Col. 1, line 50, "at" should read --as--.

Col. 1, line 60, "sb" should read --so--.

Col. 1, line 64-65, "First, hole" should read
        --First, a hole--.

Col. 5, Claim 7, line 30, "fist" should read --first--.

Col. 6, Claim 8, line 14, "aid" should read --said--.

Signed and Sealed this

Eighth Day of September, 1992

Attest:

DOUGLAS B. COMER

Attesting Officer

Acting Commissioner of Patents and Trademarks